Patented Dec. 9, 1941

2,265,255

UNITED STATES PATENT OFFICE 2,265,255

PROCESS FOR PREPARING POLYVINYL ACETAL AND KETAL RESINS

Gelu S. Stamatoff, Arlington, N. J., assignor to E. I. du Pont de Nemours & Company, Wilmington, Del., a corporation of Delaware No Drawing. Application March 8, 1939, Serial No. 260,506

7 Claims. (Cl. 260—66)

This invention relates to the preparation of synthetic resins and, more particularly, to the preparation of polyvinyl acetals and ketals by the condensation of polyvinyl alcohol with an organic compound possessing an active carbonyl group, i. e., an aldehyde or a ketone.

The preparation of these acetal and ketal resins is usually accomplished in two steps comprising (1) converting a polyvinyl ester, generally polyvinyl acetate, completely or partially to polyvinyl alcohol and (2) effecting a condensation of the polyvinyl alcohol with an aldehyde or a ketone. The two steps are sometimes carried out separately one after the other and sometimes side by side in the same reaction batch. The present invention relates to both of these techniques, which are referred to in the art as the two-stage and the one-stage processes, respectively.

To catalyze the reaction of condensation it has been customary to use substances of acid reaction such as mineral acids, sulphonic acids, acid salts, and the like. Mineral acids have been the most generally used because of their effectiveness and cheapness but, ordinarily, with not entirely satisfactory results; this is particularly true when the polyvinyl acetal or ketal resin, which is the final product, must meet the strict requirements of use as interlayer material in safety glass. For example, the use of sulphuric acid as a catalyst of the condensation reaction results in a product of fairly good color but the difficulty of removal of the sulphuric acid residues from the resin leads to a deficiency in heat stability. Hydrochloric acid, on the other hand, is much more readily removed from the final resin and thus does not give a resin deficient in heat stability but does damage the color of the product prior to its isolation.

An object of the present invention is to provide an improved process for the preparation of resins made by the condensation of polyvinyl alcohol with aldehydes or ketones. More specifically, it is an object of the invention to produce such resins having improved color and heat stability. A further object is to effect these improvements in the quality of the resin while following either the two-stage or the one-stage technique and, further, to accomplish these results in an economical manner. A still further object of the invention is to provide a condensation catalyst which is readily removed from the finished products. Other objects will be apparent from the description of the invention given hereinafter.

The above objects are accomplished according to the present invention by reacting together polyvinyl alcohol, by which term, as used herein, are included both partially and completely hydrolyzed polyvinyl esters, with an organic compound possessing an active carbonyl group in the presence of preformed methylol sulphonic acid as a condensation catalyst. The term "methylol sulphonic acid" is used herein to denote that substance formed by the absorption of sulphur dioxide in an aqueous solution of formaldehyde. This substance is generally designated by workers in the art as "methylol sulphonic acid" and it is believed to be this compound but, due to inability to isolate and identify this substance positively, some doubt has been raised as to its absolute identity. For convenience sake, the substance is quite generally referred to as "methylol sulphonic acid." Correctly or not, this term is used herein but it should be understood that it refers to the substance obtained by the absorption of sulphur dioxide in aqueous formaldehyde solution regardless of what the future may prove this substance to be.

The present invention comprises the discovery that preformed methylol sulphonic acid has a powerful catalytic influence on the condensation of either complete or partially hydrolyzed polyvinyl esters with aldehydes or ketones and it possesses certain features of superiority over the catalysts heretofore used for this purpose. The methylol sulphonic acid may be used as a catalyst with equal success in either the two-stage or one-stage process.

The methylol sulphonic acid is conveniently prepared by passing sulphur dioxide gas into formalin, i. e., an aqueous solution of formaldehyde, of about 38% strength. The amount of sulphur dioxide which will be absorbed by 38% formalin is about 16%, by weight, and it is preferred, although by no means essential, to use the catalyst at or near full strength.

As previously stated, the methylol sulphonic acid must be preformed to have an effective catalytic action on the herein considered condensation reaction. There is a single exception to this, namely, in the condensation of polyvinyl alcohol with formaldehyde where little difference is found between the effect of preformed methylol sulphonic acid and where the ingredients to form this compound are added separately to the reaction batch.

The following examples are given to illustrate specific embodiments of the invention, parts being given by weight where not otherwise specified.

The first ten examples relate to the production of polyvinyl acetals and ketals by the two-stage process, the examples themselves describing merely the second stage, starting with polyvinyl alcohol:

*Example I.*—A methylol sulphonic acid catalyst solution is prepared by saturating 38% formalin with sulphur dioxide, i. e., bubbling the gas into the liquid until no more is absorbed. The resulting solution, titrated with 0.1 normal alkali, exhibits an acidity of 4.7 normal.

A mixture is made of:

|   | Parts |
|---|---|
| Polyvinyl alcohol | 44 |
| Methanol | 340 |
| Water | 5 |
| n-Butyraldehyde | 32 |

To this is added 12 parts of the catalyst solution and the reaction batch is then maintained at about 66° C. After 12 minutes a clear solution is formed; from appearances the completion of the condensation is thus indicated, but the batch is kept at 66° C. for 75 minutes longer. The polyvinyl butyral formed is then precipitated by means of water, washed and dried in conventional manner. The resulting resin contains 23.4% of polyvinyl alcohol.

*Example II.*—This example illustrates the comparatively trivial difference in action between preformed methylol sulphonic acid or methylol sulphonic acid formed in the reaction batch, on the condensation of polyvinyl alcohol with formaldehyde to form polyvinyl formal.

Batch A is made up of:

|   | Parts |   |
|---|---|---|
| Polyvinyl alcohol | 44 | |
| Denatured ethanol | 185 | |
| Water | 33 | |
| Formalin | 57 | |
| Previously prepared mixture of: | | |
|   Formalin (38%) | 18.5 parts | |
|   Sulphur dioxide | 4.0 parts | 22.5 |

Batch B is made up of:

|   | Parts |   |
|---|---|---|
| Polyvinyl alcohol | 44 | |
| Previously prepared solution of: | | |
|   Sulphur dioxide | 4 parts | |
|   In denatured ethanol | 185 parts | 189 |
| Water | 33 | |
| Formalin (38%) | 75.5 | |

The two batches were heated at about 74° C. and their behavior was substantially identical, each batch reaching the condition of an elastic gel in 25–30 minutes and that of a clear viscous solution in a further 30–45 minutes.

*Example III.*—This example illustrates the necessity of using preformed methylol sulphonic acid as the condensation catalyst when formaldehyde is not the organic compound being condensed.

Batch A is made up of:

|   | Parts |
|---|---|
| Polyvinyl alcohol | 44 |
| Methanol | 50 |
| Acetone | 200 |
| Water | 7.5 |
| n-Butyraldehyde | 32 |
| Formalin(38%) saturated with sulphur dioxide | 7.4 |

This batch is heated at reflux temperature for 1.5 hours and yields a resin containing only 13.4% of polyvinyl alcohol which represents a rather high degree of acetalization.

Batch B is made up of:

|   | Parts |
|---|---|
| Polyvinyl alcohol | 44 |
| Methanol | 50 |
| Acetone | 200 |
| Water | 7.5 |
| n-Butyraldehyde | 32 |
| Sulphur dioxide | 12 |

At reflux temperature there is no evidence of reaction in the batch after several hours' time although the content of sulphur dioxide is greater than in batch A. The subsequent addition, to this batch, of 8 parts of formalin (38%) initiates a very slow reaction in great contrast from the rapid reaction brought about in batch A by the preformed methylol sulphonic acid.

If the identical procedure followed with batch A is carried out with the use of 1.7 parts of concentrated sulphuric acid instead of the methylol sulphonic acid catalyst, local discoloration takes place and the finished resin contains 14.7% of polyvinyl alcohol. This amount of sulphuric acid provides the same total acidity as that provided by the methylol sulphonic acid catalyst in batch A but the amount of aldehyde condensation effected is slightly less than that effected in the same time and at the same temperature through the catalytic action of the methylol sulphonic acid catalyst and, of importance, the product of the reaction catalyst by sulphuric acid is of inferior color and heat stability.

*Example IV.*—The procedure of Example I is followed, except for the use of only 6 parts of the methylol sulphonic acid catalyst solution, and 36 parts of n-butyraldehyde, and the batch is maintained at 66° C. for 1.75 hours. The resulting resin is substantially identical with that produced in Example I.

*Example V.*—A mixture is made of:

|   | Parts |
|---|---|
| Polyvinyl alcohol | 44 |
| Methanol | 104 |
| Water | 3.6 |
| n-Butyraldehyde | 32 | and to this there is added 6.8 parts of the catalyst prepared as in Example I. The whole is stirred at reflux temperature for 1.8 hours. The finished resin has a polyvinyl alcohol content of 20 per cent.

*Example VI*

|   | Parts |
|---|---|
| Polyvinyl alcohol | 44 |
| Methanol | 340 |
| Cyclohexanone | 44 |
| Methylol sulphonic acid solution as in Example I | 12 | are heated at 66° C., with stirring, for 5 hours.

*Example VII*

|   | Parts |
|---|---|
| Polyvinyl alcohol | 44 |
| Methanol | 340 |
| Methyl cyclohexanone | 44 |
| Methylol sulphonic acid solution as in Example I | 12 | are heated at 66° C., with stirring, for 5 hours.

Example VIII

| | Parts |
|---|---|
| Polyvinyl alcohol | 44 |
| Methanol | 340 |
| Acetophenone | 60 |
| Methylol sulphonic acid solution as in Example I | 12 | are heated at reflux temperature, with stirring, for 6 hours.

Example IX

| | Parts |
|---|---|
| Polyvinyl alcohol | 44 |
| Methanol | 340 |
| Benzophenone | 90 |
| Methylol sulphonic acid solution as in Example I | 12 | are heated at reflux temperature, with stirring, for 6 hours.

The following example shows the application of the invention to the preparation of polyvinyl acetal resins by the one-stage process in which the conversion of a polyvinyl ester to polyvinyl alcohol and the condensation of the latter with an aldehyde are conducted side by side in the same reaction batch:

*Example X.*—Polyvinyl acetate, 75 parts, is dissolved in ethyl alcohol, of 92.4 per cent strength by weight, 50 parts. To this solution is added 40 parts of n-butyraldehyde and then 15 parts of a methylol sulphonic acid catalyst made from 38% formalin and containing 15.8% sulphur dioxide. The mixture is maintained at 70° C. in a closed vessel for 24 hours. It is then diluted with ethyl alcohol, and water is added to cause precipitation of the polyvinyl acetal resin.

*Example XI.*—The procedure of Example X is followed exactly, except for the substitution of iso-butyraldehyde for n-butyraldehyde.

In all of the examples the resin produced is separated from the reaction batch by known methods, conveniently by precipitation by means of water, followed by washing with water and drying. Residual methylol sulphonic acid is removed by volatilization in the course of the drying.

It will be understood that the above examples are merely illustrative, the invention broadly comprising the use of methylol sulphonic acid as a catalyst for the condensation of polyvinyl alcohol with an aldehyde or ketone.

In the preparation of polyvinyl acetal or ketal resins with the use of methylol sulphonic acid as a catalyst by either the two-stage or the one-stage process, the selection of the liquid vehicle in which the reaction is conducted, is immaterial in so far as the effectiveness of the catalyst is concerned. Generally, there is used as the liquid vehicle an organic liquid which is a solvent for the resin produced although, as known in the art, the procedure may be reversed by using a solvent for the polyvinyl alcohol as the liquid, the acetal or ketal resin being precipitated as formed. Alcohols are usually employed as the liquid vehicle for the reaction but ketones and lower aliphatic acids and other organic liquids are sometimes employed to advantage.

The reaction, of either two-stage or one-stage type, is usually most conveniently and effectively conducted at reflux temperature, but will proceed at temperatures as low as room temperature, although generally more slowly. If desired, the reaction may be conducted at higher temperatures, in suitable pressure equipment.

Among the polyvinyl esters suitable as starting materials, polyvinyl acetate will ordinarily be chosen because of its relative availability and low cost, but it is to be understood that other polyvinyl esters, such as polyvinyl propionate and polyvinyl formate, may be used instead without essential change in the process or in the effectiveness of the catalyst of the invention. In those cases where the catalyst of the invention is used only in the second stage of a two-stage process, the source of the polyvinyl alcohol is obviously of no consequence, unless it contains residues of the ester, and, provided, of course, that it is of suitable quality and purity.

As is well known to those skilled in the art, the viscosity of the polyvinyl acetate resin is governed principally by the viscosity of the polyvinyl ester which forms the starting material.

In so far as the present invention is concerned, the specific choice of complete or partial polyvinyl alcohol, and the aldehyde or ketone, is as broad as in the preparation of polyvinyl acetals and ketals employing conventional catalysts. Up to the present time, the resins formed by the condensation of polyvinyl alcohol with the lower aliphatic aldehydes, up to and including valeraldehyde, have been most prominent among the polyvinyl acetals whereas the resins formed by the condensation of polyvinyl alcohol with the cyclic ketones appear most promising among the polyvinyl ketals. However, the present invention is equally applicable to the formation of the whole range of resins from either aldehydes or cyclic ketones with complete or partial polyvinyl alcohol.

Methylol sulphonic acid possesses several points of superiority over catalysts heretofore utilized in the preparation of polyvinyl acetal and ketal resins from polyvinyl esters. In contradistinction to the catalysts heretofore known, which have had the effects of causing discoloration in the reaction batch or of impairing the heat-stability of the resin because of difficulty of removal therefrom, or both of these defects together, the catalyst of the present invention does not cause discoloration of the reaction batch and, being removed from the polyvinyl acetal or ketal resin in the course of its washing and drying, does not remain in the finished product as a cause of instability to heat.

The superiority in color of polyvinyl acetal resins produced with the catalyst of the present invention over those produced with the acid catalysts heretofore employed is less noticeable in some instances than others. For example, where butyraldehyde is used as the condensing aldehyde than where formaldehyde is used, but is distinct even in the former case.

As has been illustrated in Example III, the catalyst of the present invention promotes the reaction of condensation at least as rapidly as does sulphuric acid.

A further advantage of the use of the catalyst of the present invention is that, in doing away with the utilization of strong mineral acids, it obviates their recognized deleterious effects upon polyvinyl compounds and upon aldehydes and ketones.

As many apparently widely different embodiments of this invention may be made without departing from the spirit and scope thereof, it is to be understood that the invention is not limited to the specific embodiments thereof except as defined in the appended claims.

I claim:

1. Process which comprises reacting together polyvinyl alcohol and a cyclic ketone in the presence of preformed methylol sulphonic acid as a condensation catalyst.

2. Process of preparing a polyvinyl butyral resin which comprises reacting together polyvinyl alcohol and a butyraldehyde in the presence of preformed methylol sulphonic acid as a condensation catalyst.

3. Process of preparing a polyvinyl butyral resin which comprises mixing together polyvinyl alcohol, n-butylraldehyde, and catalytic amounts of methylol sulphonic acid, in methanol as a liquid vehicle for the reaction, and heating the resulting mixture to effect condensation between the polyvinyl alcohol and the n-butyraldehyde.

4. Process of preparing a polyvinyl butyral resin which comprises mixing together polyvinyl acetate, n-butylraldehyde, and catalytic amounts of methylol sulphonic acid, in methanol as a liquid vehicle for the reaction, and heating the resulting mixture to convert the polyvinyl acetate at least in part to polyvinyl alcohol and to effect a condensation between the said polyvinyl alcohol and the n-butylraldehyde.

5. Process of preparing a resin which comprises reacting together polyvinyl alcohol and an organic compound having a reactive carbonyl group selected from the group consisting of butyraldehydes, valeraldehyde and cyclic ketones, in the presence of methylol sulfonic acid as a condensation catalyst.

6. Process of preparing a resin which comprises mixing together polyvinyl alcohol, an organic compound having a reactive carbonyl group selected from the group consisting of butylraldehydes, valeraldehyde and cyclic ketones, and catalytic amounts of methylol sulfonic acid, in a liquid vehicle which is a solvent for the resin to be formed, and heating the resulting mixture to effect condensation.

7. Process of preparing a resin which comprises mixing together a polyvinyl ester, an organic compound having a reactive carbonyl group selected from the group consisting of butyraldehydes, valeraldehyde and cyclic ketones, and catalytic amounts of methylol sulfonic acid in a liquid vehicle which is a solvent for the resin to be formed, and heating the resulting mixture to convert the polyvinyl ester at least in part to polyvinyl alcohol and to effect a condensation.

GELU S. STAMATOFF.